United States Patent
Hatayama et al.

(10) Patent No.: US 7,027,215 B2
(45) Date of Patent: Apr. 11, 2006

(54) OPTICAL COMPONENT, OPTICAL AMPLIFICATION MODULE, AND OPTICAL TRANSMISSION SYSTEM

(75) Inventors: Hitoshi Hatayama, Yokohama (JP); Motoki Kakui, Yokohama (JP); Tatsuhiko Shitomi, Yokohama (JP); Masayuki Shigematsu, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 284 days.

(21) Appl. No.: 10/654,987

(22) Filed: Sep. 5, 2003

(65) Prior Publication Data

US 2004/0047022 A1    Mar. 11, 2004

(30) Foreign Application Priority Data

Sep. 10, 2002    (JP)    ............................ P2002-264500

(51) Int. Cl.
*H01S 3/00*    (2006.01)
*G02B 6/26*    (2006.01)

(52) U.S. Cl. ...................................... 359/337.1; 385/27
(58) Field of Classification Search ............. 359/337.1, 359/337.22; 385/27, 39
See application file for complete search history.

(56) References Cited

U.S. PATENT DOCUMENTS 5,596,661 A * 1/1997 Henry et al. .................... 385/24
6,160,627 A * 12/2000 Ahn et al. ..................... 356/477
6,633,698 B1 * 10/2003 Hatayama et al. ............. 385/27
6,823,094 B1 * 11/2004 Goh et al. ...................... 385/14

FOREIGN PATENT DOCUMENTS

EP    001072937 A1 * 1/2001
JP    WO 01/05005 A1    1/2001

OTHER PUBLICATIONS

K. Inoue, et al., "Tunable Gain Equalization Using a Mach-Zehnder Optical Filter in Multistage Fiber Amplifiers," IEEE Photonics Technology Letters, vol. 3, No. 8, pp. 718-720 (1991).
H. Toba, et al., "Demonstration of Optical FDM Based Self-Healing Ring Network Employing Arrayed-Waveguide-Grating ADM Filters and EDFAs," Proceedings of ECOC '94, pp. 263-266 (1994).
M. Fukutoku, et al., OAA1996, Tech. Dig, FA4.

* cited by examiner

*Primary Examiner*—Mark Hellner
(74) *Attorney, Agent, or Firm*—McDermott Will & Emery LLP

(57) ABSTRACT

The present invention relates to an optical component and others in structure capable of implementing improved compensation for a gain slope. The optical component is equipped with first and second Mach-Zehnder interferometers. The first Mach-Zehnder interferometer is provided with a first temperature controller for controlling a temperature of at least one of a part of an optical main path and a first optical side path, while the second Mach-Zehnder interferometer 42 is also provided with a second temperature controller for controlling a temperature of at least one of a part of the optical main path and a second optical side path. A filter circuit having a wavelength-dependent insertion loss is disposed between the first and second Mach-Zehnder interferometers, and a controller controls the temperatures of the optical paths by use of the first and second temperature controllers on the basis of the insertion loss of the filter circuit, thereby setting a loss for light of a predetermined wavelength propagating between a light input end and a light output end.

10 Claims, 12 Drawing Sheets

OPTICAL COMPONENT, OPTICAL AMPLIFICATION MODULE, AND OPTICAL TRANSMISSION SYSTEM

BACKGROUND OF THE INVENTION

1. Field of the Invention

The present invention relates to an optical component mainly suitable for such a devices as gain equalizers for equalizing the gain of amplification of signal light in optical amplifiers, an optical amplification module incorporating the optical component, and an optical transmission system incorporating the optical component.

2. Related Background Art

The optical amplifiers are provided with an optical waveguide doped with a fluorescent substance which can be pumped by pumping light, and a pumping means for supplying the pumping light into the optical waveguide, and are provided in repeaters or the like in optical transmission systems. Particularly, in the case of the optical amplifiers applied to the WDM (Wavelength Division Multiplexing) optical transmission systems for transmitting signal light in which a plurality of signal channels of mutually different wavelengths are multiplexed (multiplexed signal light), it is important to amplify the plurality of signal channels included in the signal light all together at an equal gain and to keep optical powers of the plurality of signal channels stably at a target value. In order to equalize the gains of amplification of the signal channels in the optical amplifier of this type, therefore, an optical component like an optical filter having a loss spectrum of shape similar to a gain spectrum in the optical waveguide is used as a gain equalizer.

For example, Document 1 (K. Inoue, et al., "Tunable Gain Equalization Using a Mach-Zehnder Optical Filter in Multistage Fiber Amplifiers," IEEE Photonics Technology Letters, Vol. 3, No. 8, pp. 718–720 (1991)) describes the technology of achieving gain flattening of the optical amplifier with an optical filter having a Mach-Zehnder interferometer. Document 2 (H. Toba, et al., "Demonstration of Optical FDM Based Self-Healing Ring Network Employing Arrayed-Waveguide-Grating ADM Filters and EDFAs," Proceedings of ECOC '94, pp. 263–266 (1994)) describes the optical filters in the configuration in which two optical filters as described in Document 1 above are cascaded.

SUMMARY OF THE INVENTION

The Inventors conducted research on the above prior art and found the following problems.

Namely, in the technology described in above Document 1, the optical power of the signal light injected into the optical amplifier varies, for example, when the loss of the optical transmission line located in the pre-stage of the optical amplifier varies for some reason. In this case, in order to keep the optical power of the output signal light from the optical amplifier constant, it is necessary to change the amplification gain of the signal light in the optical amplifier. Then the change of the gain leads to variation in wavelength dependence of the gain, i.e., variation in the gain slope. As a result, the gain flatness of the optical amplifier degrades, so as to cause variation of optical powers of the respective signal channels outputted from the optical amplifier.

In order to overcome this problem, the technology described in above Document 2 employed the method of regulating temperatures of optical couplers and a branch path in each of the Mach-Zehnder interferometers forming the optical filter, according to the optical power of input signal, and thereby adjusting the loss slope of the optical filter. Namely, the technology described in above Document 2 implements compensation for the variation in the gain slope due to the variation of the optical power of input signal. However, the change of the loss slope of the optical filter according to the optical power of input signal results in variation in the loss level in the signal wavelength band. This means that S/N ratios of the signal light amplified in the optical amplifier vary and degrade. This optical filter also requires simultaneous control over many heaters (six heaters) for the adjustment of the loss slope, so that the control is complicated over the loss slope.

In order to overcome this problem, Document 3 (the brochure of International Publication WO01/05005) suggests an optical filter suitable for the gain equalizers and others in the optical amplifiers, simple in structure, and easy in control over the loss slope. The Inventors conducted various experiments using the optical filter described in above Document 3. During the experiments the Inventors found that in some cases perfect compensation for the gain slope was not possible by only the optical filter described in above Document 3.

The present invention has been accomplished in order to solve the problem described above, and an object of the invention is to provide an optical component of structure capable of implementing improved compensation for the gain slope, an optical amplification module incorporating the optical component, and an optical transmission system incorporating the optical component.

Figure 1A:
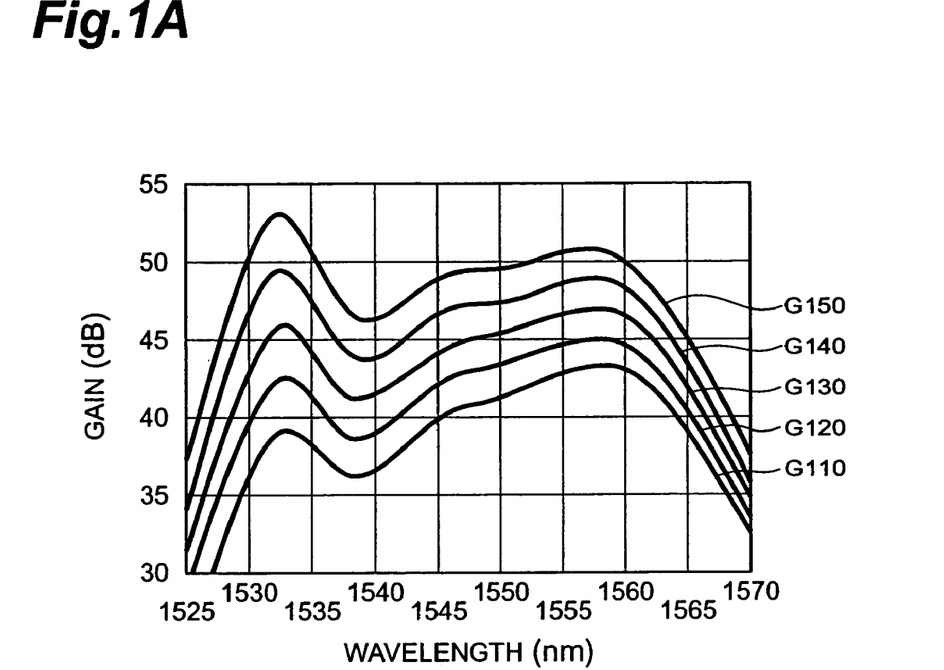
FIGS. 1A and 1B are graphs showing gain changes dependent upon input light powers, and linear compensations.

The Inventors noted that gain change dependent upon wavelengths of input light occurred with change in the optical power of input light into the optical amplifier. An example of the gain change is presented in FIG. 1A. FIG. 1A is a graph showing the gain change of EDF part in an EDFA (Erbium-Doped Fiber Amplifier) with change in the optical power of input light, in which graph G110 represents a gain spectrum at the input light power Pin of −11 dBm, graph G120 a gain spectrum at the input light power Pin of −14 dBm, graph G130 a gain spectrum at the input light power Pin of −17 dBm, graph G140 a gain spectrum at the input light power Pin of −20 dBm, and graph G150 a gain spectrum at the input light power Pin of −23 dBm. As shown in FIG. 1A, the gain change is dependent upon the wavelengths of input light, and has the gain slope of such linear shape as to increase the gain almost monotonically toward the short wavelength side in the wavelength range of 1555 nm to 1565 nm. On the other hand, it is difficult to apply the linear approximation to the gain change in the broadband signal wavelength region of 1525 nm or more.

Figure 1B:
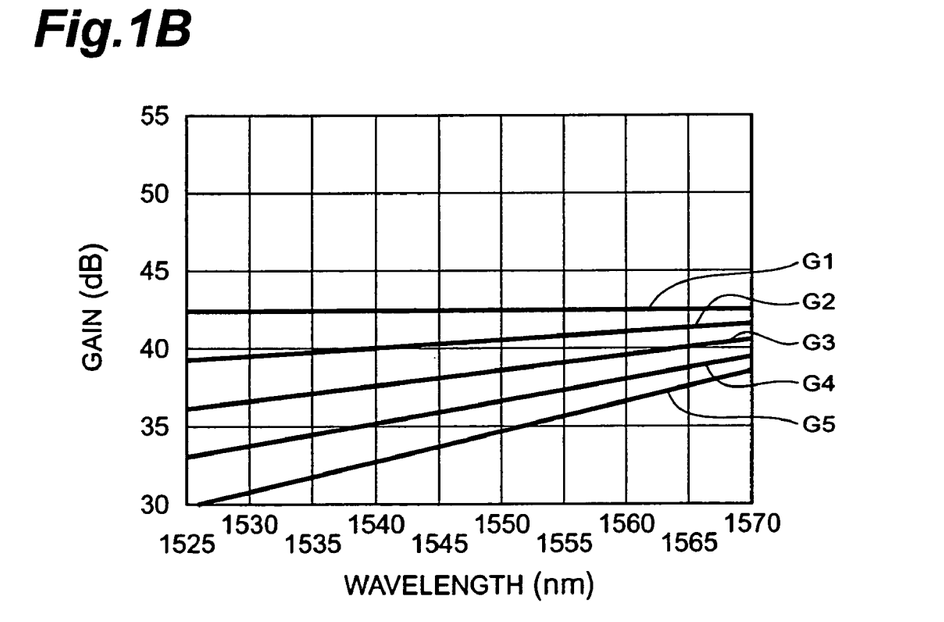
Figure 2:
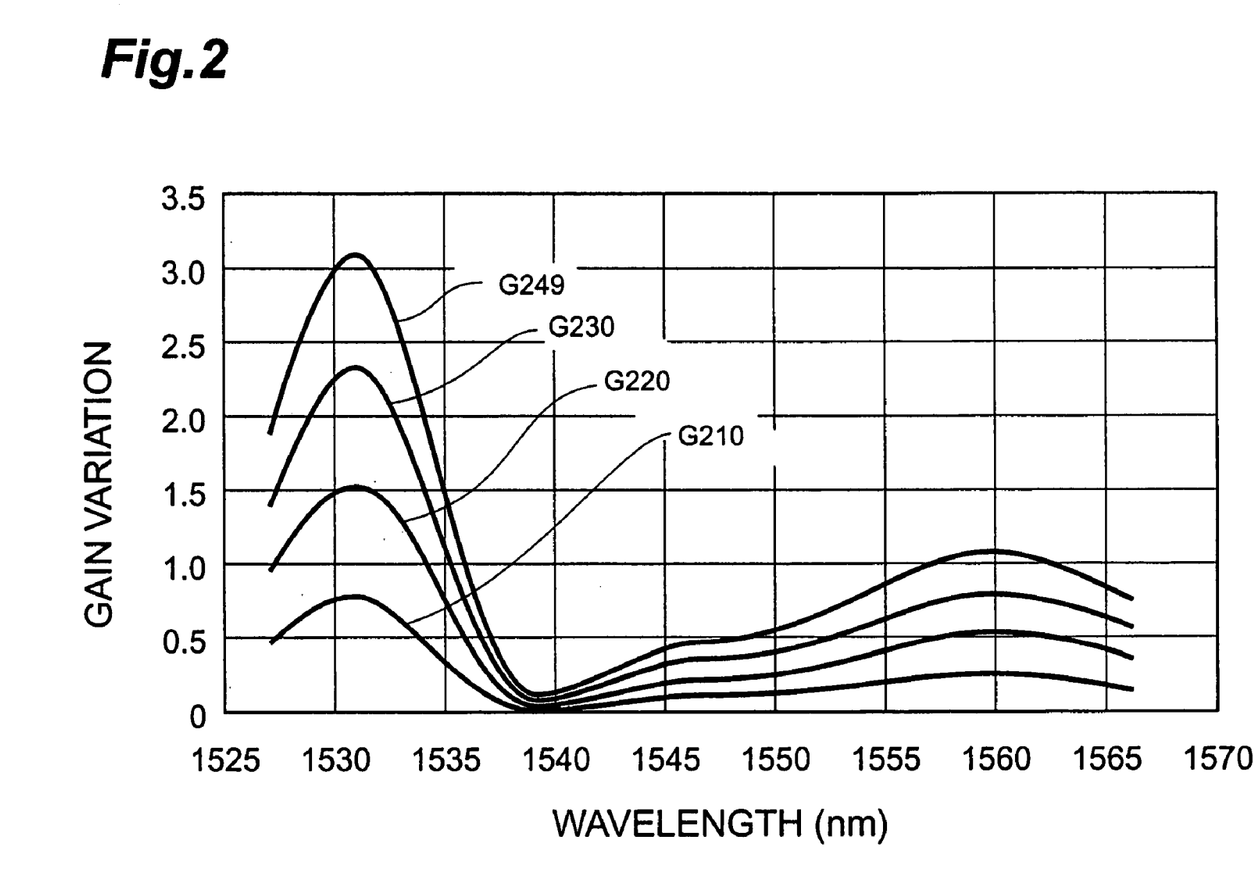
FIG. 2 is a graph showing gain variations after the linear compensations.

FIG. 2 presents the result of compensation with linear slopes shown in FIG. 1B by means of the optical filter described in above Document 3. In FIG. 1B, the linear slope of graph G1 corresponds to the gain slope of graph G150 (the input light power Pin=− 23 dBm) in FIG. 1A; similarly, graph G2 to graph G140 (input light power Pin=−20 dBm), graph G3 to graph G130 (input light power Pin=−17 dBm), graph G4 to graph G120 (input light power Pin=−14 dBm), and graph G5 to graph G110 (input light power Pin=−11 dBm). Graphs G210–G240 in FIG. 2 show remaining gain variations after the compensation on the basis of the spectrum in the case where the input light power Pin is −11 dBm. In FIG. 2, graph G210 represents the gain variation at the input light power Pin of −14 dBm, graph G220 the gain variation at the input light power Pin of −17 dBm, graph G230 the gain variation at the input light power Pin of −20 dBm, and graph G240 the gain variation at the input light power Pin of −23 dBm.

As shown in FIG. 2, the compensation can be implemented with small gain variation in the case where the wavelength band lies on the wavelength side longer than 1538 nm, but the gain variation becomes relatively large in the case of the broadband signal wavelength region. The present invention has been accomplished noting the wavelength characteristics of the gain slope on the basis of these information.

An optical component according to the present invention comprises an optical main path in which light is guided from a light input end to a light output end; first and second Mach-Zehnder interferometers; and a first filter circuit disposed between these first and second Mach-Zehnder interferometers. The first Mach-Zehnder interferometer comprises a first optical coupler and a second optical coupler disposed on the optical main path; and a first optical side path disposed between the first and second optical couplers and adjacent to a part of the optical main path. The second Mach-Zehnder interferometer comprises a third optical coupler and a fourth optical coupler disposed on the optical main path; and a second optical side path disposed between the third and fourth optical couplers and adjacent to a part of the optical main path. The first filter circuit has a wavelength-dependent insertion loss and is located on a third optical side path disposed between the second and third optical couplers and adjacent to a part of the optical main path, or on a part of the optical main path. Furthermore, the optical component according to the present invention comprises a first temperature controller for controlling a temperature of at least one of a part of the optical main path located between the first and second optical couplers, and the first optical side path; and a second temperature controller for controlling a temperature of at least one of a part of the optical main path located between the third and fourth optical couplers, and the second optical side path.

The optical component according to the present invention may further comprise a controller for controlling temperatures of the optical paths by use of the first and second temperature controllers on the basis of the insertion loss of the first filter circuit, in order to set a loss of the light between the light input end and the light output end.

In the optical component of the present invention, transmission characteristics of the first and second Mach-Zehnder interferometers are adjusted by the temperature control using the first and second temperature controllers. When this temperature control is carried out based on the insertion loss of the first filter circuit, the rate of the light propagating in the first filter circuit to the overall input light can be properly adjusted. Therefore, when the temperature control is carried out by the first and second temperature controllers on the basis of the insertion loss of the first filter circuit, it becomes feasible to set a loss profile according to wavelengths of signal light.

In the optical component according to the present invention, the first filter circuit may be configured so that a fifth optical coupler, a sixth optical coupler, and a seventh optical coupler are disposed on one of a part of the optical main path located between the second and third optical couplers, and the third optical side path. In this configuration, a fourth optical side path is disposed between the fifth and sixth optical couplers and adjacent to a part of the main path and a part of the third optical side path, and the fourth optical side path and the fifth and sixth optical couplers constitute a third Mach-Zehnder interferometer. A fifth optical side path is disposed between the sixth and seventh optical couplers and adjacent to a part of the optical main path and a part of the third optical side path, and the fifth optical side path and the sixth and seventh optical couplers constitute a fourth Mach-Zehnder interferometer. An optical path length of the fourth optical side path is preferably different from an optical path length of the part of the optical main path or the part of the third optical side path on which the fifth and sixth optical couplers are disposed. Furthermore, an optical path length of the fifth optical side path is also preferably different from an optical path length of the part of the optical main path or the part of the third optical side path on which the sixth and seventh optical couplers are disposed. When each optical path length of the fourth and fifth optical side paths is made different from the optical path length of the part of the optical main path or the part of the third optical side path adjacent thereto, it becomes easy to set each insertion loss in the third and fourth Mach-Zehnder interferometers.

In the optical component according to the present invention, the first filter circuit may comprise a grating formed on the part of the main path or the third optical side path located between the second optical coupler and the third optical coupler. The grating enables setting of the insertion loss of the filter circuit and thus permits the setting of the insertion loss with higher accuracy.

The optical component according to the present invention may comprise, together with the first filter circuit located on one of the part of the main path and the third optical side path as described above, a second filter circuit located on the other of the part of the main path and the third optical side path. In this case, insertion loss spectra of the first and second filter circuits are preferably different from each other. When the adjustment of the transmission characteristics in the first and second Mach-Zehnder interferometers is carried out based on the insertion loss spectra of the first and second circuits, it becomes feasible to properly control the rates of the light propagating in each of the first and second filter circuits to the overall input light. As a consequence, it becomes feasible to change the amplitude ratio of the loss spectra of the two different filter circuits.

In the optical component according to the present invention, each of the first and second filter circuits may comprise a grating. Since the gratings permit individual settings of the respective insertion loss spectra of the first and second filter circuits, it becomes feasible to implement the settings of the insertion loss spectra with higher accuracy.

An optical amplification module according to the present invention comprises the optical component of the structure as described above (the optical component according to the present invention). The optical amplification module of this configuration can achieve the action of the above optical component and function as a better optical amplifier. The optical amplification module according to the present invention preferably further comprises a variable loss slope compensator.

An optical transmission system according to the present invention comprises the optical component of the structure as described above (the optical component according to the present invention). Since the optical transmission system of this configuration can achieve the action of the above optical component, it can function as a better optical transmission system. The optical transmission system according to the present invention preferably further comprises a variable loss slope compensator.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Each of embodiments of the optical component, the optical amplification module, and the optical transmission system according to the present invention will be described below in detail with reference to FIGS. 3–6, 7A–8C, and 9–12. The same reference symbols will denote the same portions throughout the description of the drawings, without redundant description thereof.

First Embodiment of Optical Component

Figure 3:
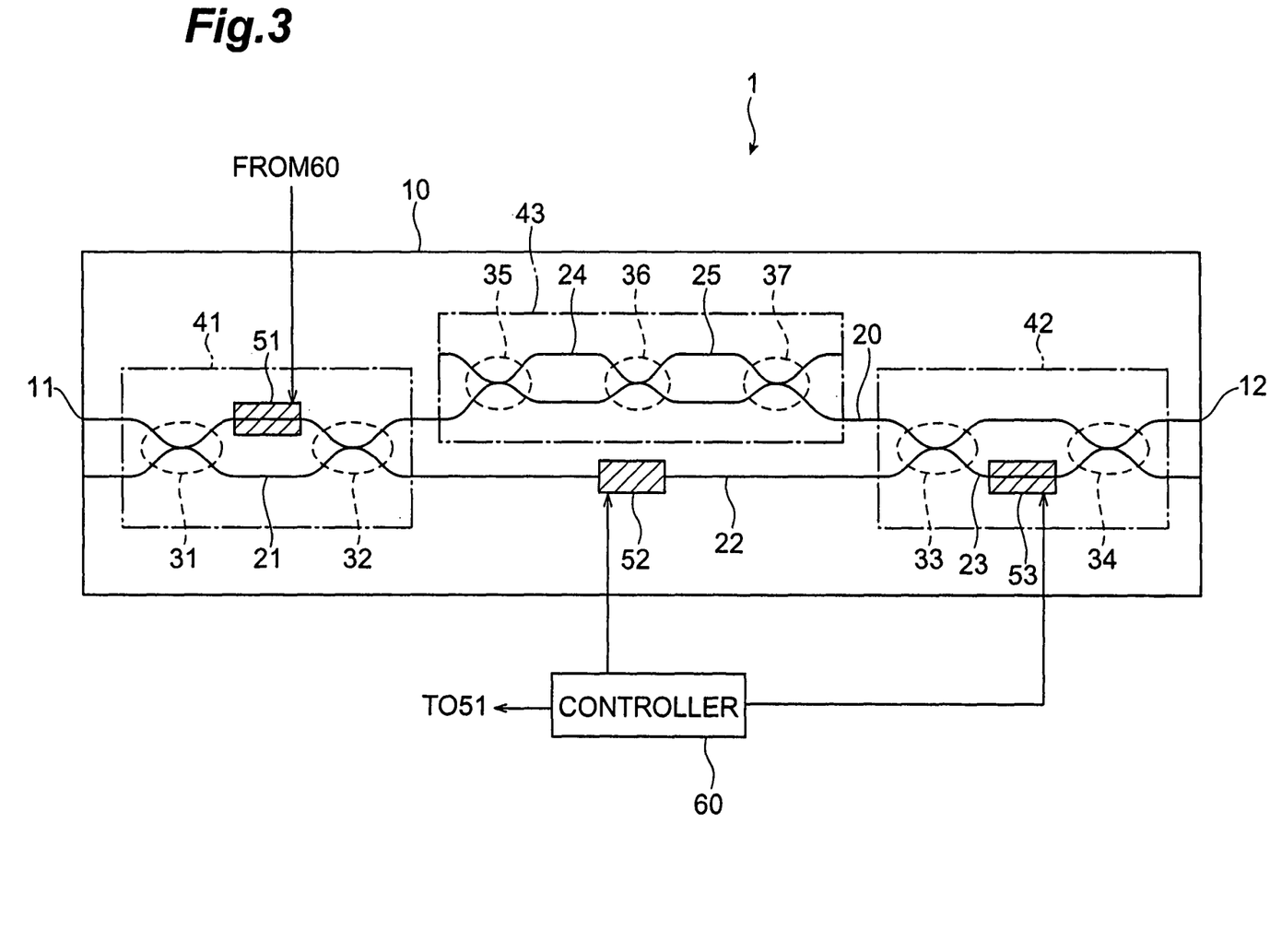
FIG. 3 is a diagram showing the structure of the first embodiment of the optical component according to the present invention.

An optical filter will be described as an optical component according to the present invention. FIG. 3 is a diagram showing the structure of the optical filter being the optical component according to the first embodiment. This optical filter 1 is a planar lightguide circuit formed on substrate 10, and includes an optical main path 20, a first optical side path 21, a second optical side path 23, a heater 51 as a first temperature controller, a heater 53 as a second temperature controller, a filter circuit 43, a third optical side path 22, and a heater 52. The heaters 51, 52, and 53 are controlled by a controller 60.

The optical main path 20 is an optical path disposed between a light input end 11 located at one end face of the substrate 10 and a light output end 12 located at the other end face. On this main path 20 there are a first optical coupler 31, a second optical coupler 32, a third optical coupler 33, and a fourth optical coupler 34 provided in the order named from the light input end 11 to the light output end 12. A part of the main path 20 and the first optical side path 21 adjacent to each other are optically coupled to each other through each of the first optical coupler 31 and the second optical coupler 32. A first Mach-Zehnder interferometer 41 is composed of the part of the main path 20, the first optical side path 21, the first optical coupler 31, and the second optical coupler 32.

A part of the main path 20 and the second optical side path 23 adjacent to each other are optically coupled to each other through each of the third optical coupler 33 and the fourth optical coupler 34. A second Mach-Zehnder interferometer 42 is composed of the part of the main path 20, the second optical side path 23, the third optical coupler 33, and the fourth optical coupler 34. The first Mach-Zehnder interferometer 41 and the second Mach-Zehnder interferometer 42 are cascaded to each other while sharing the main path 20 and the third optical side path 22. A part of the main path 20 and the third optical side path 22 adjacent to each other are optically coupled to each other through each of the second optical coupler 32 and the third optical coupler 33.

The filter circuit 43 is disposed on a part of the main path 20 located between the second optical coupler 32 and the third optical coupler 33. This filter circuit 43 is comprised of a fifth optical coupler 35, a sixth optical coupler 36, and a seventh optical coupler 37 arranged in the order named from the first Mach-Zehnder interferometer 41 side and disposed on the main path 20, and the filter circuit 43 further includes a fourth optical side path 24 located along the main path 20 between the fifth optical coupler 35 and the sixth optical coupler 36, and a fifth optical side path 25 located along the main path 20 between the sixth optical coupler 36 and the seventh optical coupler 37.

A part of the main path 20 and the fourth optical side path 24 adjacent to each other are optically coupled to each other through each of the fifth optical coupler 35 and the sixth optical coupler 36. Accordingly, a third Mach-Zehnder interferometer is composed of the fourth optical side path 24, the fifth optical coupler 35 and the sixth optical coupler 36, and a part of the main path 20 located between the fifth optical coupler 35 and the sixth optical coupler 36. A part of the main path 20 and the fifth optical side path 25 adjacent to each other are optically coupled to each other through each of the sixth optical coupler 36 and the seventh optical coupler 37. Therefore, a fourth Mach-Zehnder interferometer is composed of the fifth optical side path 25, the sixth optical coupler 36 and the seventh optical coupler 37, and a part of the main path 20 located between the sixth optical coupler 36 and the seventh optical coupler 37.

The heater 51 is provided on a part of the main path 20 located between the first optical coupler 31 and the second optical coupler 32. This heater 51 regulates the temperature of part of the main path 20 to adjust the optical path difference between the main path 20 and the first optical side path 21 in the first Mach-Zehnder interferometer 41, thereby controlling the transmission characteristic of the first Mach-Zehnder interferometer 41. The heater 53 is provided on the second optical side path 23 located between the third optical coupler 33 and the fourth optical coupler 34. This heater 53 regulates the temperature of the second optical side path 23 to adjust the optical path difference between the main path 20 and the second optical side path 23 in the second Mach-Zehnder interferometer 42, thereby controlling the transmission characteristic of the second Mach-Zehnder interferometer 42. The heater 52 is located on the third optical side path 22 to make correction for phase deviation between the filter circuit 43 and the third optical side path 22.

In this filter 1 (the optical component in the first embodiment), each of coupling rates of the first optical coupler 31, the second optical coupler 32, the third optical coupler 33, and the fourth optical coupler 34 is 0.5. The optical path difference between the first optical coupler 31 and the second optical coupler 32 and the optical path difference between optical path lengths of the main path 20 and the first optical side path both are 0 μm, and the optical path difference between the third optical coupler 33 and the fourth optical coupler 34 and the optical path difference between optical path lengths of the main path 20 and the second optical side path 23 both are also 0 μm.

In the filter circuit 43 the coupling rate of the fifth optical coupler 35 is 0.05, the coupling rate of the sixth optical coupler 36 0.13, and the coupling rate of the seventh optical coupler 37 0.05. The difference between the optical path length of the part of the main path 20 located between the fifth optical coupler 35 and the sixth optical coupler 36, and the optical path length of the fourth optical side path 24 is 36.0 μm, and the difference between the optical path length of the main path 20 located between the sixth optical coupler 36 and the seventh optical coupler 37, and the optical path length of the fifth optical side path 25 is 37.8 μm.

In general, the optical transmittance T of a Mach-Zehnder interferometer with a heater is expressed by the following equation.

$$T = P_{out}/P_{in} = 1 - 2C(1-C)(1+\cos \Delta\phi)$$

In this equation, $P_{out}$ represents the power of output light, $P_{in}$ the power of input light, C the coupling rate of the optical coupler, and $\Delta\phi$ a phase shift amount due to heat by the heater. Supposing the coupling rate C is 0.5, the optical transmittance T can be optionally controlled in the range of 0 to 1 by adjusting $\Delta\phi$.

For example, where the phase shift amount $\Delta\phi 1$ of the heater 51 and the phase shift amount $\Delta\phi 3$ of the heater 53 both are 0, the optical transmittance T becomes 0 and the entire input light from the light input end 11 propagates through the third optical side path 22 to be outputted from the light output end 12. On the other hand, when the phase shift amount $\Delta\phi 1$ of the heater 51 and the phase shift amount $\Delta\phi 3$ of the heater 53 both are 180°, the optical transmittance T is 1, so that the entire input light from the light input end 11 passes through the filter circuit 43 to be outputted from the light output end 12. By adjusting the phase shift amount $\Delta\phi 1$ of the heater 51 and the phase shift amount $\Delta\phi 3$ of the heater 53 in the range of 0 to 180° in this way, it becomes feasible to optionally control the branching ratio of the Mach-Zehnder interferometers. It is thus feasible to optionally control the amplitude of wavelength-dependent loss caused by the filter circuit 43.

Figure 4:
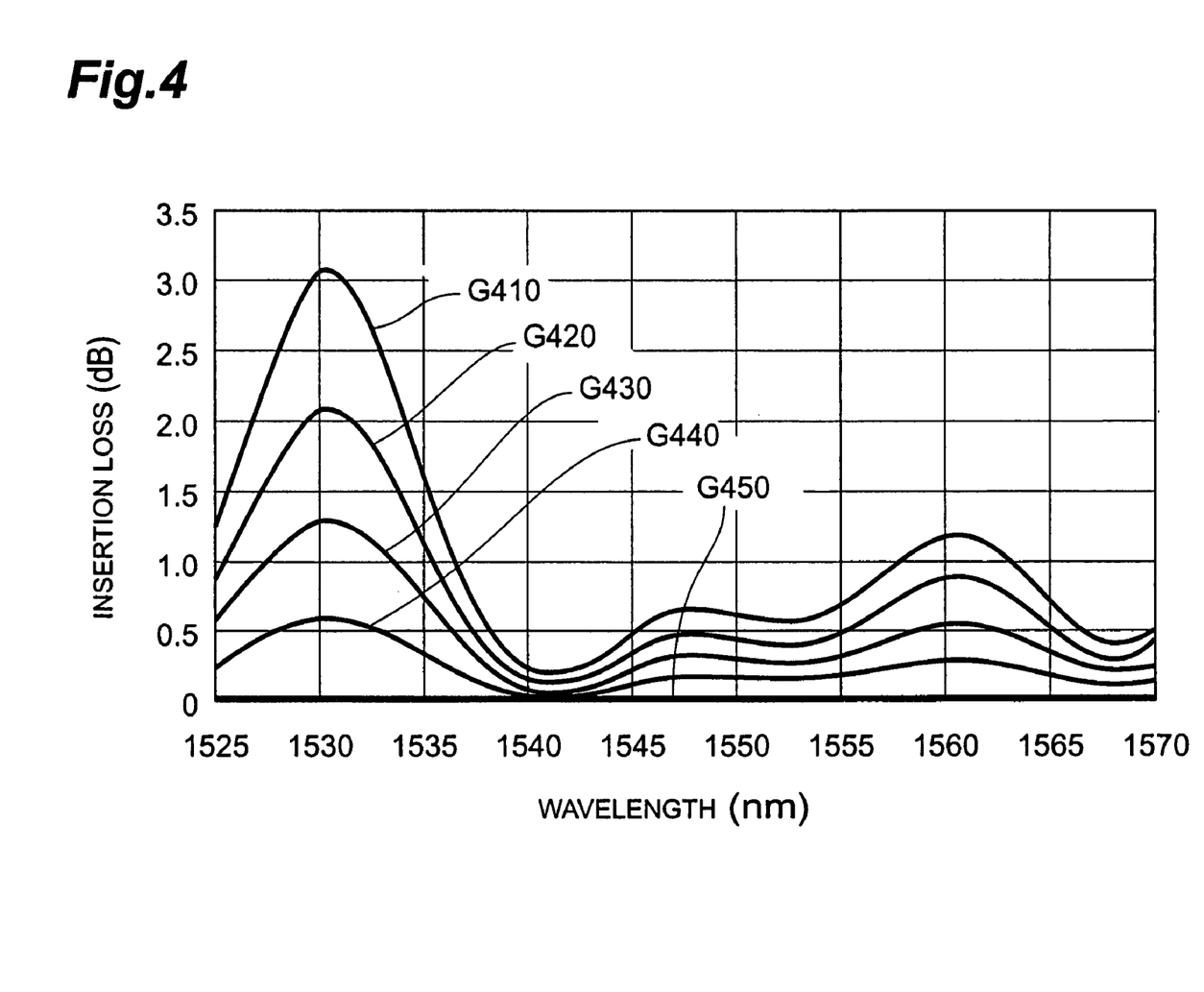
FIG. 4 is a graph showing loss-wavelength characteristics of the optical component in the first embodiment shown in FIG. 3.

FIG. 4 shows loss-wavelength characteristics with adjustment of each of the phase shift amount $\Delta\phi 1$ of the heater 51 and the phase shift amount $\Delta\phi 3$ of the heater 53. In FIG. 4, graph G410 represents an insertion loss spectrum at $\Delta\phi 1$ (=$\Delta\phi 3$)=0, graph G420 an insertion loss spectrum at $\Delta\phi 1$ (=$\Delta\phi 3$)=60°, graph G430 an insertion loss spectrum at $\Delta\phi 1$ (=$\Delta\phi 3$)=90°, graph G440 an insertion loss spectrum at $\Delta\phi 1$ (=$\Delta\phi 3$)=120°, and graph G450 an insertion loss spectrum at $\Delta\phi 1$ (=$\Delta\phi 3$)=180°. For example, by setting $\Delta\phi 1 = \Delta\phi 3 = 0°$ where the input light power Pin is −23 dBm in FIG. 2, the change of gain variation can be compensated for, particularly, in the case of the broadband signal wavelength range. In the first embodiment, the filter circuit 43 is composed of the two-stage Mach-Zehnder interferometers, but it may also be composed of three or more-stage Mach-Zehnder interferometers. Provision of multi-stage Mach-Zehnder interferometers not less than three stages enables gain compensation with higher accuracy.

Second Embodiment of Optical Component

Figure 5:
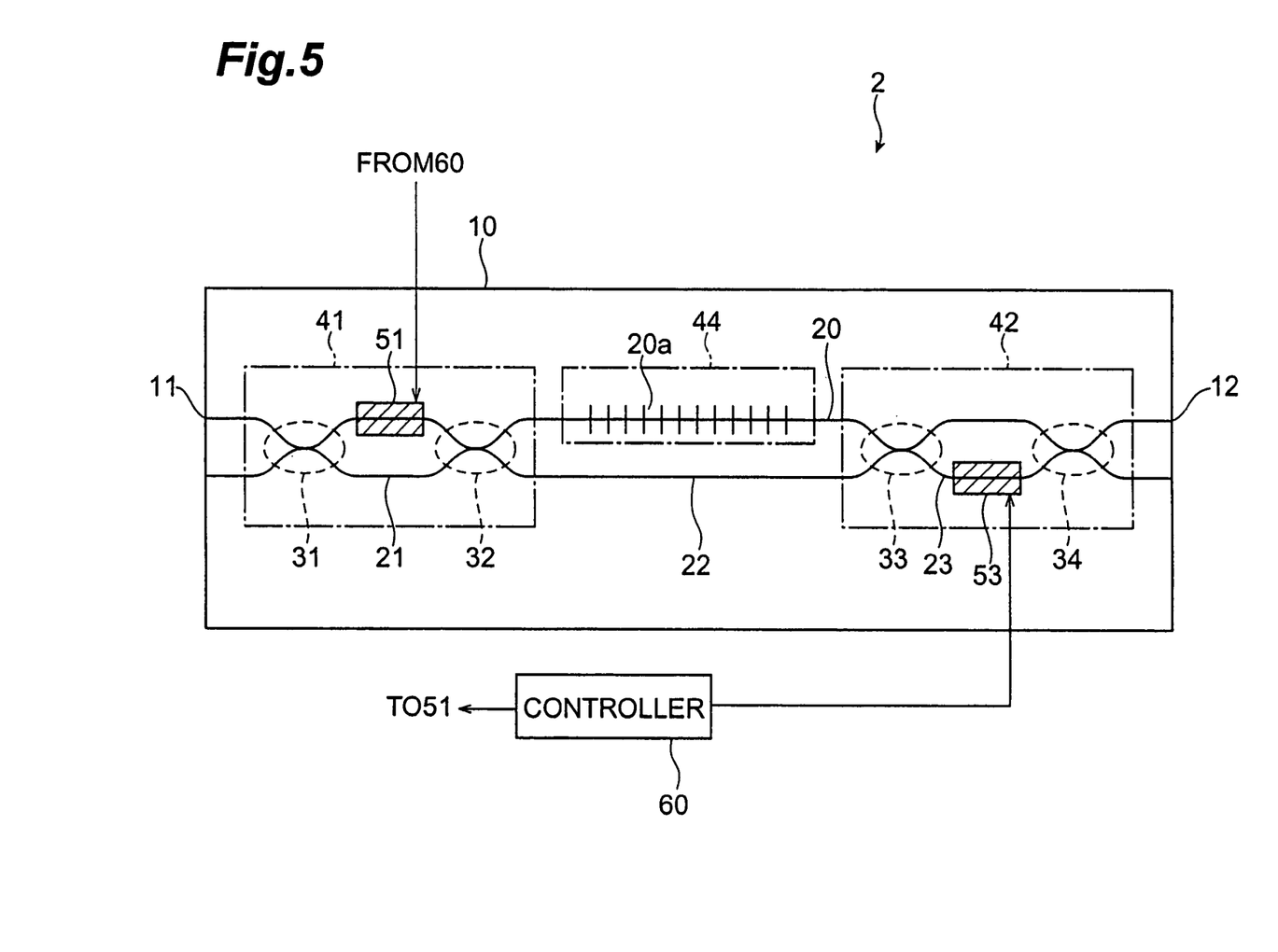
FIG. 5 is a diagram showing the structure of the second embodiment of the optical component according to the present invention.

FIG. 5 is a diagram showing the structure of an optical filter being an optical component according to the second embodiment. The optical filter 2 shown in this FIG. 5 has the configuration obtained by replacing the filter circuit 43 in the optical filter 1 shown in FIG. 3, with another filter circuit 44 and removing the heater 52. In this filter 2 according to the second embodiment, the filter circuit 44 is constructed by providing a grating 20a on a part of the main path 20 located between the first Mach-Zehnder interferometer 41 and the second Mach-Zehnder interferometer 42. This grating 20a is provided according to the wavelength characteristics necessary for the optical filter 2 to enable gain compensation with high accuracy.

Third Embodiment of Optical Component

Figure 6:
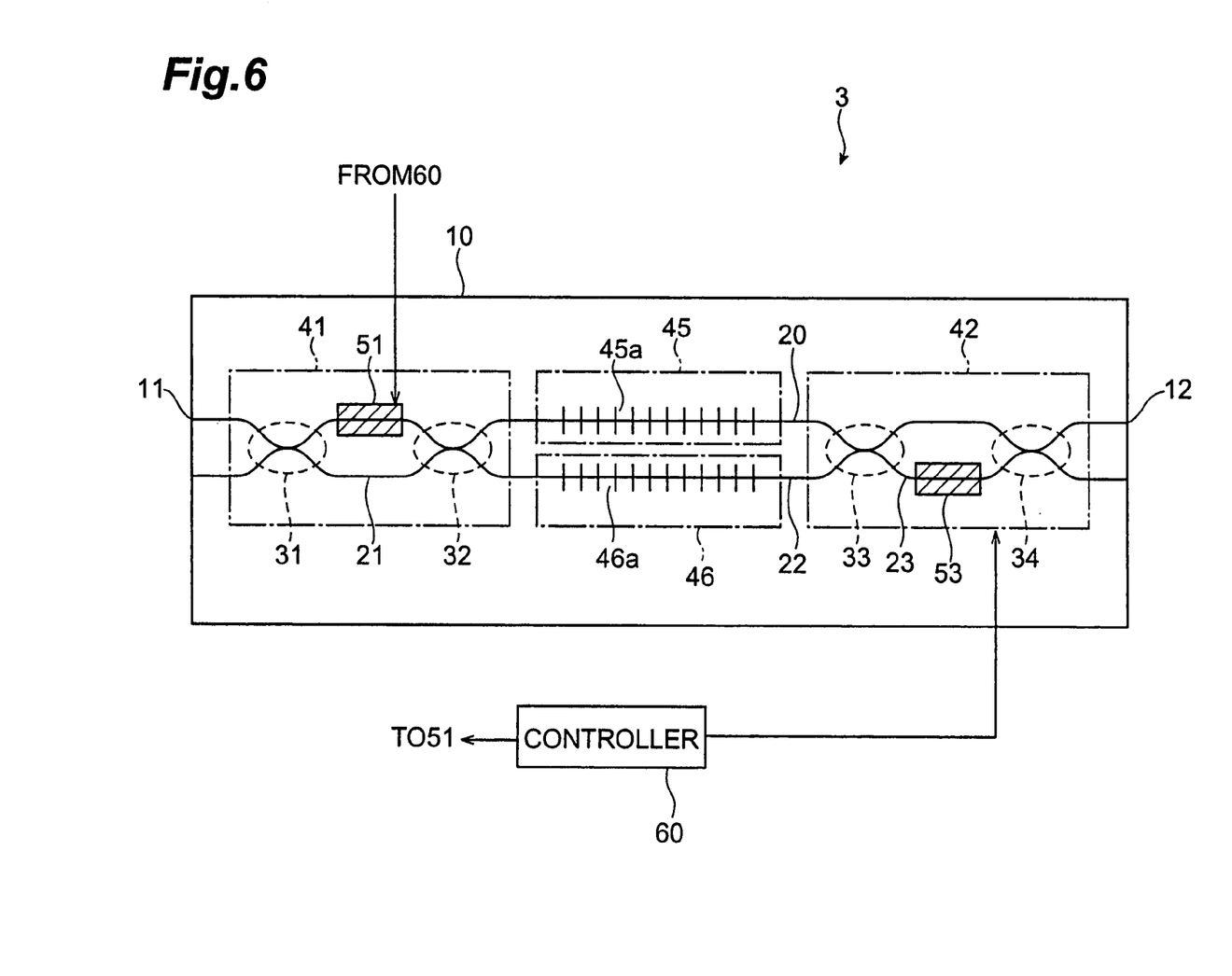
FIG. 6 is a diagram showing the structure of the third embodiment of the optical component according to the present invention.

Furthermore, FIG. 6 is a diagram showing the structure of an optical filter being an optical component according to the third embodiment. This optical filter 3 shown in FIG. 6 is a planar lightguide circuit formed on the substrate 10, and is provided with the main path 20, first optical side path 21, second optical side path 23, heater 51 as a first temperature controller, heater 53 as a second temperature controller, first filter circuit part 45, second filter circuit part 46, and third optical side path 22. The first Mach-Zehnder interferometer 41 is composed of the first optical coupler 31, second optical coupler 32, part of the main path 20 located between the first and second optical couplers 31, 32, and the first optical side path 21, as in the case of the optical filter 1 of the first embodiment, and the second Mach-Zehnder interferometer 42 is also composed of the third optical coupler 33, fourth optical coupler 34, part of the main path 20 located between the third and fourth optical couplers 33, 34, and the second optical side path 23. The first filter circuit 45 is formed on a part of the main path 20 located between the first and second Mach-Zehnder interferometers 41, 42, and the second filter circuit 46 is formed on the third optical side path 22 adjacent to the part of the main path 20.

Figure 7A:
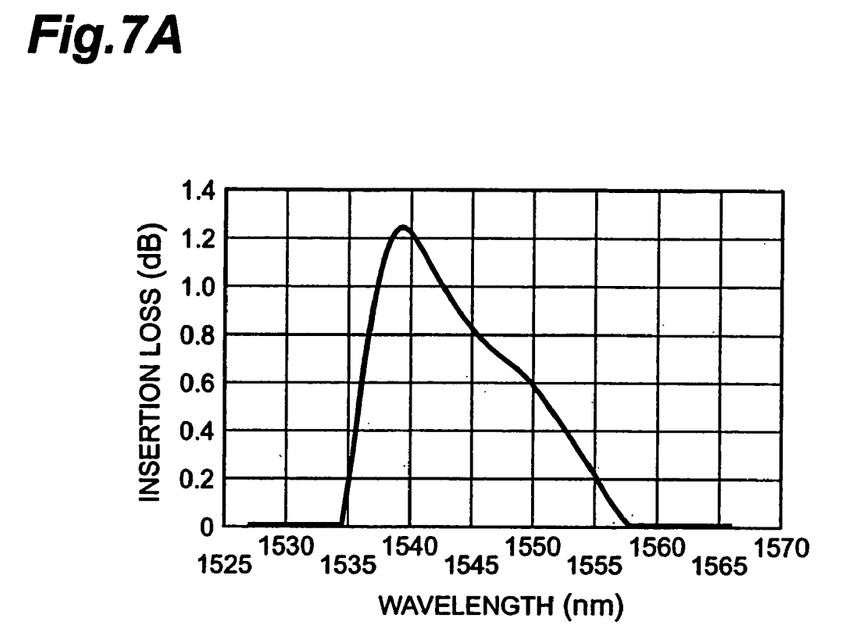
FIGS. 7A and 7B show loss spectra of the respective filter circuits in the optical component of the third embodiment shown in FIG. 6.
Figure 7B:
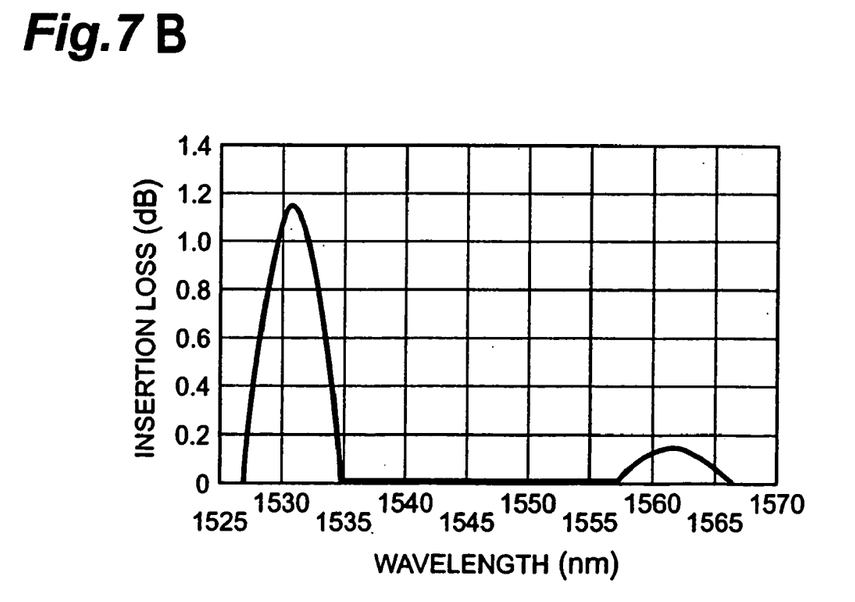

The first and second filter circuits 45, 46 have their respective loss spectra different from each other. The first filter circuit 45 includes a grating 45a. FIG. 7A shows a loss spectrum of this grating 45a. As shown in FIG. 7A, the grating 45a demonstrates the insertion loss corresponding to the wavelength band from 1534 nm to 1558 nm and has a loss peak near the wavelength of 1540 nm. On the other hand, the second filter circuit 46 includes a grating 46a. FIG. 7B shows a loss spectrum of this grating 46a. As shown in FIG. 7B, the grating 46a demonstrates the insertion loss corresponding to the wavelength side shorter than 1534 nm and the insertion loss corresponding to the wavelength side longer than 1558 nm, and the gratings 46a and 45a are in a relation of complementing each other.

When the phase shift amount $\Delta\phi1$ of the heater 51 and the phase shift amount $\Delta\phi3$ of the heater 53 each are adjusted, the ratio of light branched into the first filter circuit 45 or into the second filter circuit 46 changes. For example, when $\Delta\phi1=\Delta\phi3=0°$, the light is guided only to the second filter circuit 46, the loss-wavelength characteristic of the optical filter 3 becomes equal to that of FIG. 7B. Conversely, when $\Delta\phi1=\Delta\phi3=180°$, the light is guided only to the first filter circuit 45, and the loss-wavelength characteristic of the optical filter 3 becomes equal to that of FIG. 7A.

Figure 8A:
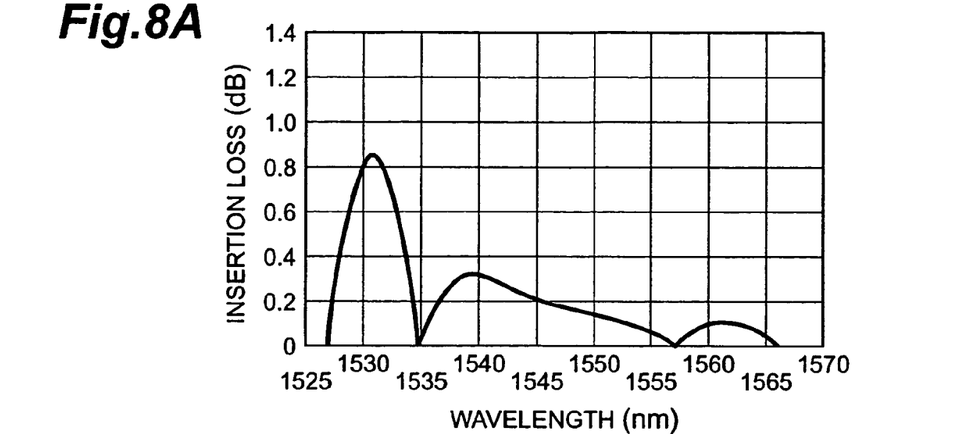
FIGS. 8A–8C are graphs showing loss-wavelength characteristics of the optical component in the third embodiment shown in FIG. 6.
Figure 8B:
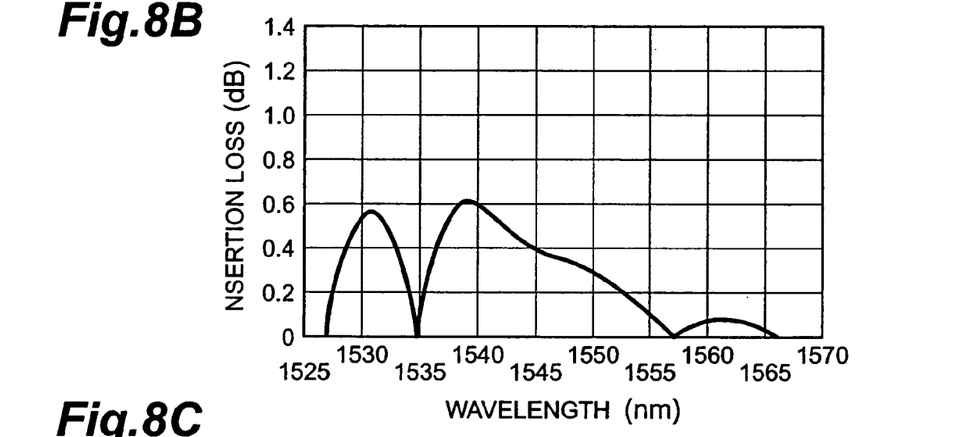
Figure 8C:
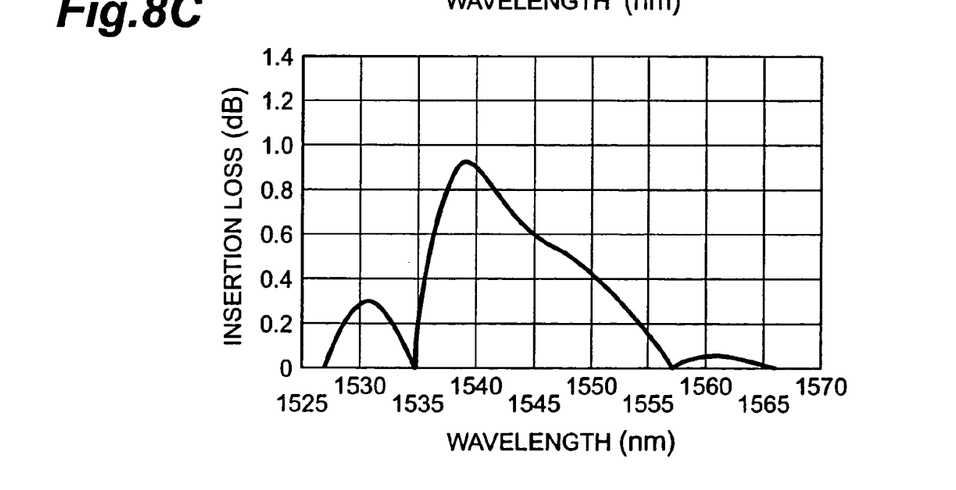

FIG. 8A shows the loss-wavelength characteristic of the optical filter 3 where $\Delta\phi1=\Delta\phi3=45°$. FIG. 8B shows the loss-wavelength characteristic of the optical filter 3 where $\Delta\phi1=\Delta\phi3=90°$. FIG. 8C shows the loss-wavelength characteristic of the optical filter 3 where $\Delta\phi1=\Delta\phi3=135°$. As shown in these FIGS. 8A–8C, the insertion loss-wavelength characteristic of the optical filter 3 can be altered by adjusting each of the phase shift amount $\Delta\phi1$ of the heater 51 and the phase shift amount $\Delta\phi3$ of the heater 53. The method of changing the amplitude ratio of loss spectra of two different filter circuits in this way yields low peak loss and is thus desirable in terms of noise property and pumping efficiency.

First Embodiment of Optical Amplification Module

Figure 9:
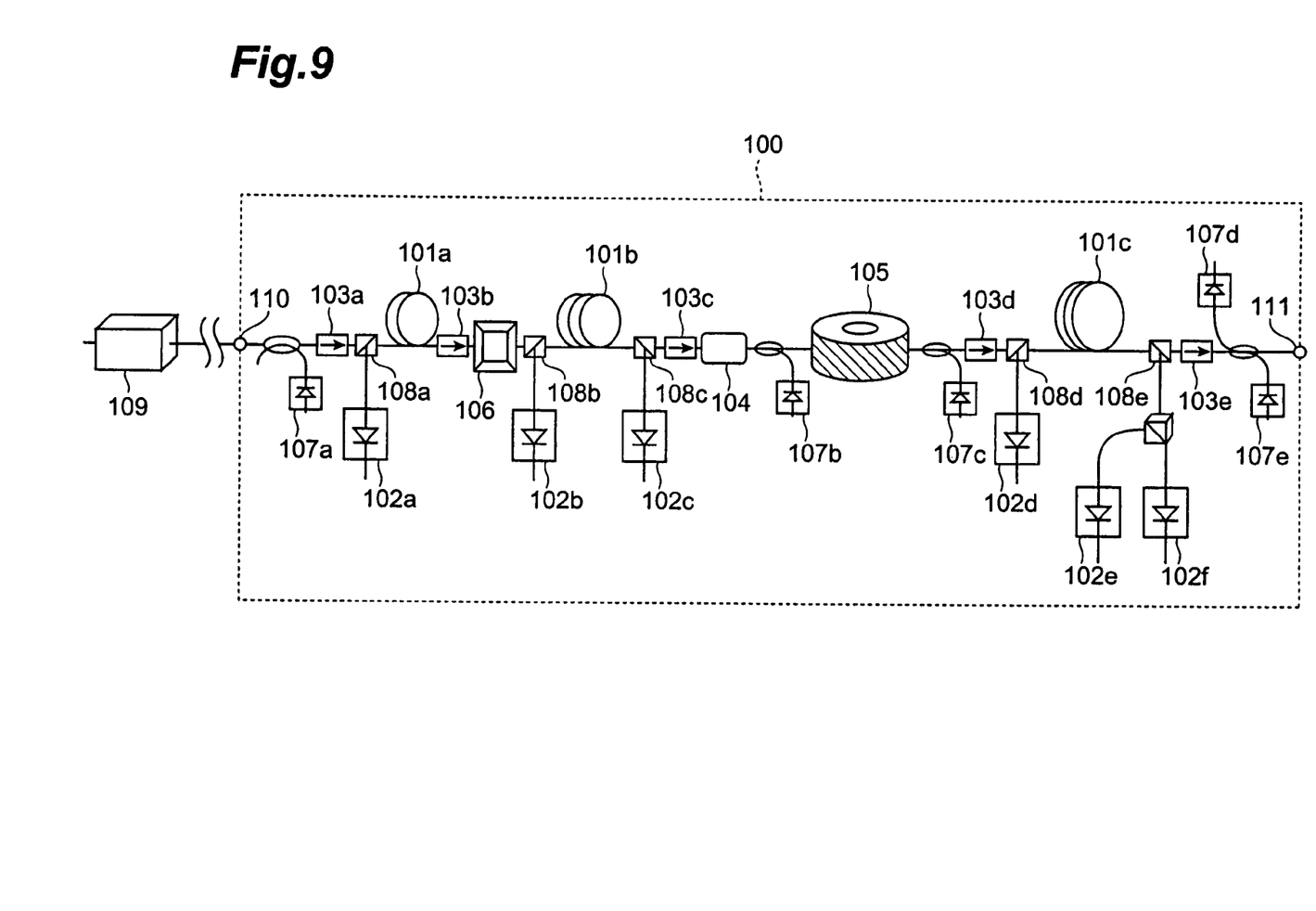
FIG. 9 is a diagram showing the structure of the first embodiment of the optical amplification module according to the present invention.

The optical filter 1 of the first embodiment, the optical filter 2 of the second embodiment, and the optical filter 3 of the third embodiment as described above can be applied to optical amplification modules constituting optical transmission systems. FIG. 9 is a diagram showing the structure of an optical amplification module (the first embodiment of the optical amplification module according to the present invention) to which one of these optical filters 1–3 can be applied.

The optical amplification module 100 according to the first embodiment is arranged in series with a variable gain slope compensator 109 on a transmission line. The optical amplification module 100 includes the following components arranged in the order named from light input end 110 toward light output end 111: isolator 103a, optical coupler 108a, amplification optical fiber 101a, isolator 103b, optical filter 106, optical coupler 108b, amplification optical fiber 101b, optical coupler 103c, isolator 103c, fixed gain equalizer 104, chromatic dispersion compensating fiber 105, isolator 103d, optical coupler 108d, amplification optical fiber 101c, optical coupler 108e, and isolator 103e. Light receiving elements 107a–107e are provided as optical monitors as occasion demands.

Each of the isolators 103a–103e transmits light in the forward direction but blocks light in the backward direction. The amplification optical fibers 101a–101c are preferably optical fibers with the core region doped with Er being a rare-earth element.

Pumping light sources 102a–102f are coupled to the respective couplers 108a–108e, and these pumping light sources 102a–102f supply pumping light into the respective amplification fibers 101a–101c. In the optical amplification module 100 according to the first embodiment, the pumping light source 102a outputs the pumping light of the wavelength of 0.98 μm, and the pumping light sources 102b–102f each output the pumping light of the wavelength of 1.48 μm.

The optical filter 106 can be one selected from the optical filters 1–3 of the first to third embodiments having the structures as described above. In this configuration shown in FIG. 9, the linear, dynamic gain slope of the optical amplification module 100 is compensated for in a lump by the variable gain slope compensator 109 provided for each of relay intervals. Inside the optical amplification module 100, gain flattening is substantialized by means of the fixed gain equalizer 104 and the optical filter 106 (the optical filter 1–3). This optical amplification module 100 is suitably applicable to systems using transmission lines with small span loss variation.

Second Embodiment of Optical Amplification Module

Figure 10:
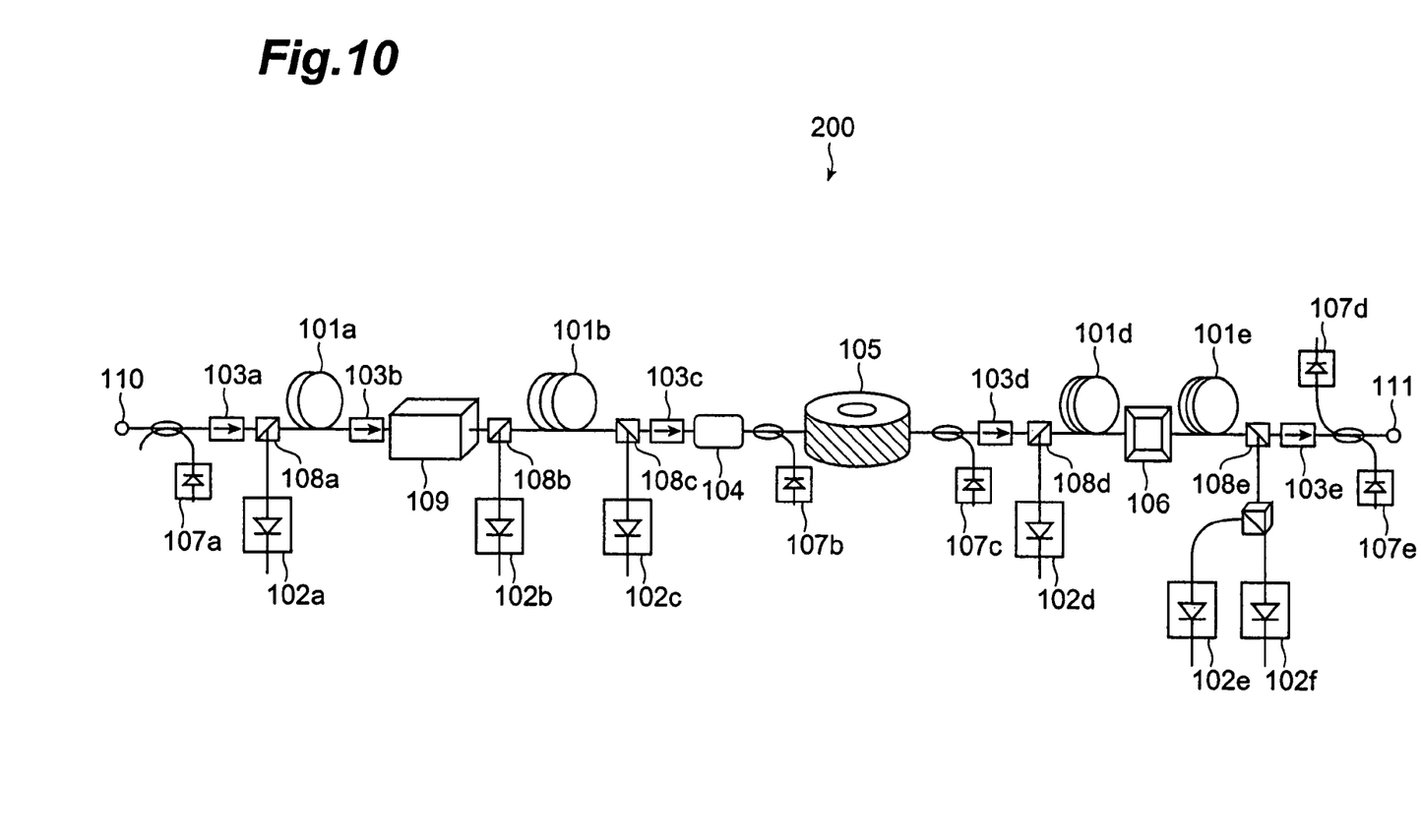
FIG. 10 is a diagram showing the structure of the second embodiment of the optical amplification module according to the present invention.

FIG. 10 is a diagram showing the structure of the optical amplification module according to the second embodiment. One selected from the optical filters 1–3 of the first to third embodiments having the structures as described above is applied to the optical amplification module 200 in the second embodiment. The optical amplification module 200 of the second embodiment is different from the optical amplification module 100 of the first embodiment described above, in that the variable gain slope compensator 109 is disposed between the isolator 103b and the optical coupler 108, the amplification optical fiber 101c is divided into amplification optical fiber 101d and amplification optical fiber 101e, and the optical filter 106 is disposed between amplification optical fiber 101d and amplification optical fiber 101e. The reason why the optical filter 106 is disposed in this way is that there is a need for adapting to increase of insertion loss due to the provision of the variable gain slope compensator 109 inside the optical amplification module 200. The optical amplification module 200 of this type is suitable for systems using transmission lines with relatively large span loss variation.

Third Embodiment of Optical Amplification Module

Figure 11A:
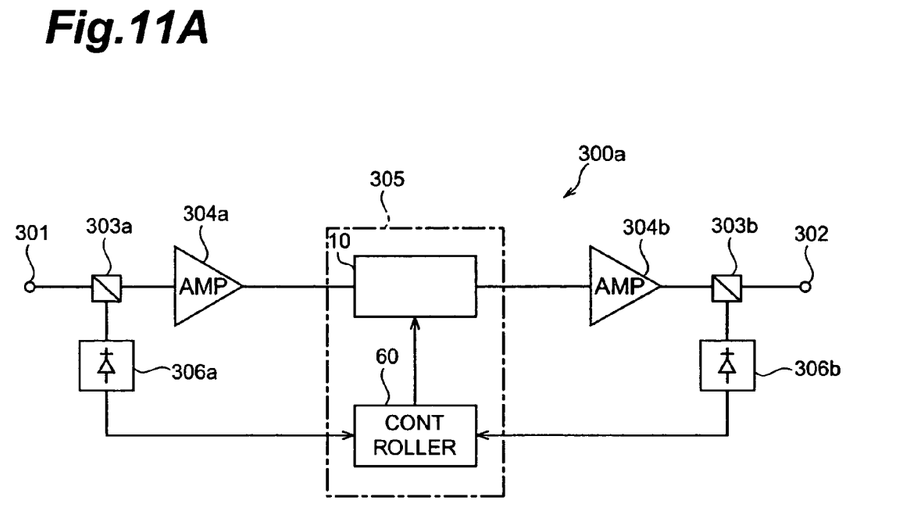
FIGS. 11A and 11B are diagrams showing configurations of the third embodiment of the optical amplification module according to the present invention.
Figure 11B:
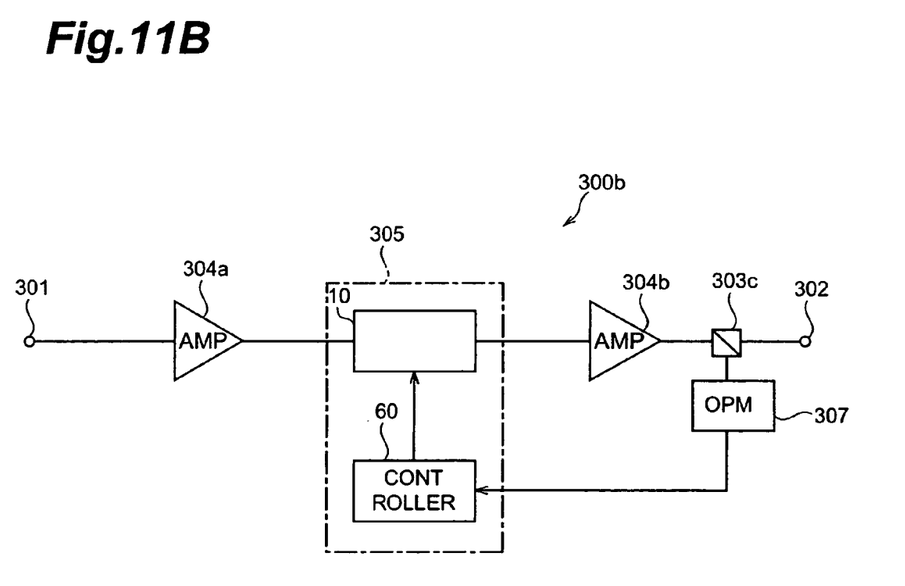

FIGS. 11A and 11B are diagrams showing configurations of the optical amplification module according to the third embodiment. The optical amplification module of the third embodiment is constructed of a combination of one selected from the optical filters 1–3 of the first to third embodiments having the structures as described above, with an optical fiber amplifier, in which the optical filter 1–3 functions as a tunable gain equalizer.

FIG. 11A is a diagram showing a configuration of a first design example of the optical amplification module according to the third embodiment. The optical amplification module 300a of the first design example is provided with the following components arranged in the order named from light input end 301 toward light output end 302: demultiplexer 303a, optical fiber amplifier 304a (Amp), optical component 305 functioning as a tunable gain equalizer (which is an optical component according to the present invention and which corresponds to one of the aforementioned optical filters 1–3), optical fiber amplifier 304b (Amp), and demultiplexer 303b.

The optical component 305 is constructed by applying one of the optical filters 1–3 having the structures as described above, and includes a planar lightguide circuit formed on the substrate 10, and a controller 60. The demultiplexer 303a separates part from input light entering through the light input end 301, and this separated light is guided to a light receiving element 306a. On the other hand, the demultiplexer 303b separates part from amplified light amplified by the optical fiber amplifier 304b, and this separated light is guided to a light receiving element 306b. The controller 60 determines the gain on the basis of outputs from the light receiving element 306a and from the light receiving element 306b, and controls the temperature controllers provided in the planar lightguide circuit on the substrate 10 so as to maintain the gain flatness of each signal channel in the signal light. The above-described demultiplexers 303a, 303b are those configured to separate part from the light propagating from the light input end 301 toward the light output end 302, but they may have such wavelength selectivity as to separate only light of a specific wavelength.

FIG. 11B is a diagram showing a configuration of a second design example of the optical amplification module according to the third embodiment. The optical amplification module 300b of the second design example is provided with the following components arranged in the order named from the light input end 301 toward the light output end 302: optical fiber amplifier 304a (Amp), optical component 305 functioning as a tunable gain equalizer (which is an optical component according to the present invention and which corresponds to one of the above-stated optical filters 1–3), optical fiber amplifier 304b (Amp), and demultiplexer 303c. In the optical amplification module 300b of the second design example, an optical spectrum of branch light separated by the demultiplexer 303c is measured by OPM (Optical Performance Monitor) 307.

The optical component 305 is constructed by applying one of the optical filters 1–3 having the structures as described above, and includes a planar lightguide circuit formed on the substrate 10, and a controller 60.

The controller 60 controls the temperature controllers provided on the planar lightguide circuit on the substrate 10 so as to keep constant the optical spectrum measured by OPM 307, thereby maintaining the gain flatness of each signal channel in the signal light.

Embodiment of Optical Transmission System

Figure 12:
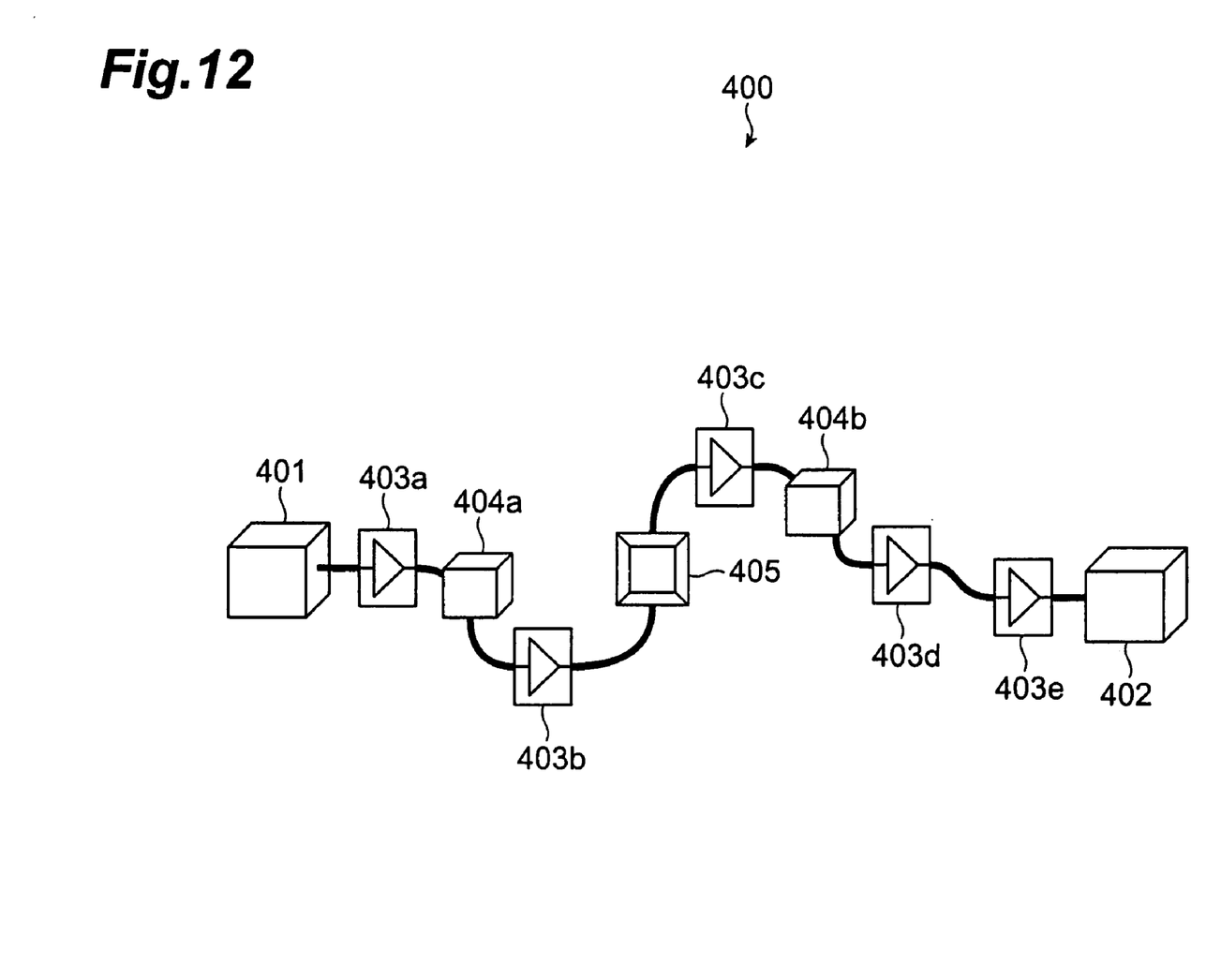
FIG. 12 is a diagram showing the structure of an embodiment of the optical transmission system according to the present invention.

The optical filters 1–3 of the first to third embodiments having the structures as described above can also be applied to optical transmission systems. FIG. 12 is a diagram showing a configuration of an embodiment of the optical transmission system according to the present invention. The optical transmission system 400 shown in this FIG. 12 is provided with optical transmitter 401 and optical receiver 402 at its terminal ends, and optical amplifiers 403a–403e are disposed on a transmission line installed between these optical transmitter 401 and optical receiver 402. Furthermore, a tunable gain equalizer 404a is disposed between optical amplifier 403a and optical amplifier 403b, and a tunable gain equalizer 403b between optical amplifier 403c and optical amplifier 403d. An optical filter 405 to which one of the aforementioned optical filters 1–3 is applied, is disposed between optical amplifier 403b and optical amplifier 403c.

In the case where the optical filter 405 is disposed on the transmission line between optical amplifiers 403a and 403e, as shown in this FIG. 12, it is preferable that the span loss be relatively small. If the optical filter 405 is located adjacent to the tunable gain equalizers 404a, 404b, the insertion loss will concentrate at one portion, which is not preferable in terms of noise property. Therefore, these transmission line elements 404a, 404b, 405 are preferably located in scattered arrangement as in the optical transmission system 400 shown in FIG. 12.

As described in each of the embodiments of the optical component according to the present invention, the transmission characteristics of the first Mach-Zehnder interferometer 41 and second Mach-Zehnder interferometer 42 are adjusted by the temperature control with the heater 51 and heater 53. When this adjustment is carried out based on the insertion loss of the filter circuit 43–46, it becomes feasible to properly control the ratio of the light propagating through the filter circuit 43–46, to the overall input light. Accordingly, in the optical component according to the present invention, the controller 60 performs the temperature control with the heater 51 and heater 53 on the basis of the insertion loss of the filter circuit 43–46 to set the loss profile according to the predetermined wavelengths.

Since the optical filter 1 is constructed so that the optical path length of the fourth optical side path 24 is different from the optical path length of the part of the main path 20 located between the fifth optical coupler 35 and the sixth optical coupler 36 and so that the optical path length of the fifth optical side path 25 is also different from the optical path length of the main path 20 located between the sixth optical coupler 36 and the seventh optical coupler 37, it is easy to set the insertion loss.

Since in the optical filter 2 the filter circuit 44 includes the grating 20a, the insertion loss of the filter circuit 44 can be set by the grating 20a, and it is thus feasible to set the insertion loss with higher accuracy.

Since the optical filter 3 is configured so that the transmission characteristics of the first Mach-Zehnder interferometer 41 and second Mach-Zehnder interferometer 42 are adjusted based on the insertion loss spectra of the first filter circuit 45 and the second filter circuit 46, it becomes feasible to properly control the ratio of the light propagating through each of the first filter circuit 45 and the second filter circuit 46, to the overall input light. Accordingly, it becomes feasible to change the amplitude ratio of two different loss spectra. In this optical filter 3, the first filter circuit 45 includes the grating 45a, while the second filter circuit 46 includes the grating 46a. Since in the filter 3 the insertion loss spectra can be set by the gratings in this way, it becomes feasible to set the total insertion loss spectrum with higher accuracy.

Interference type devices such as Fabry-Pérot etalons or optical grating type elements may also be employed as wave filters, instead of the filter circuit 44 in FIG. 5 or instead of the first and second filter circuits 45, 46 in FIG. 6. The Fabry-Pérot etalons suitably applicable are those the inclination of which can be adjusted relative to the optical axis. More specifically, a filter can be substantialized by arranging a Fabry-Pérot etalon comprised of glass films coated with coatings of reflectance R on both surfaces intersecting with the optical axis, so as to be inclinable relative to the optical axis. This Fabry-Pérot etalon has the transmission spectral function $T(\lambda)$ given by the following equation.

In the equation, R represents the reflectance, n the index of refraction, d the thickness of the Fabry-Pérot etalon, and θ the inclination relative to the optical axis of the Fabry-Pérot etalon. Therefore, this Fabry-Pérot etalon can readily realize a sinusoidal spectrum that can be shifted in the wavelength direction by being inclined relative to the optical axis. When the Fabry-Pérot etalon is applied to a filter circuit, the optical filter can be fabricated in simple structure and at low cost.

An optical grating element suitably applicable is a combination of a polarization separating coupler, and multiple stages constituted by birefringent plates and wedge elements on one optical path after separation by the coupler. The optical grating element of this type is described, for example, in M. Fukutoku, et al., "OAA1996, Tech. Dig, FA4." This optical grating element realizes a sinusoidal function loss spectrum that can be shifted in the wavelength direction, and the amplitude of the loss thereof can also be variable. Like effect can also be achieved by replacing the birefringent plates with liquid crystals in the optical grating element. When the optical grating element is applied to a filter circuit, the optical circuit can be compactified so that the total length becomes approximately 70 mm to 80 mm.

According to the present invention, as described above, the transmission characteristics of the first and second Mach-Zehnder interferometers are adjusted by the temperature control with the first and second temperature controllers. When this adjustment is carried out based on the insertion loss of the filter circuit, it becomes feasible to properly control the ratio of the light propagating in the filter circuit to the overall input light. Accordingly, when the temperature control is carried out with the first temperature controller and the second temperature controller on the basis of the insertion loss of the filter circuit, it becomes feasible to set the loss profile according to the predetermined wavelengths. Namely, the present invention successfully provides the optical component, optical amplification module, and optical transmission system capable of implementing improved compensation for the gain slope, which is the object of the present invention.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical component comprising:
   an optical main path in which light is guided from a light input end to a light output end;
   a first optical coupler and a second optical coupler respectively provided on said optical main path;
   a first optical side path provided between said first and second optical couplers and adjacent to a part of said optical main path, wherein a first Mach-Zehnder interferometer is comprised of said first optical side path and said first and second optical couplers;
   a third optical coupler and a fourth optical coupler respectively provided on said optical main path;
   a second optical side path provided between said third and fourth optical couplers and adjacent to a part of said optical main path, wherein a second Mach-Zehnder interferometer is comprised of said second optical side path and said third and fourth optical couplers;
   a third optical side path provided between said second and third optical couplers and adjacent to said optical main path;
   a first temperature controller for controlling a temperature of at least one of a part of said optical main path located between said first and second optical couplers, and said first optical side path;
   a second temperature controller for controlling a temperature of at least one of a part of said main path located between said third and fourth optical couplers, and said second optical side path; and
   a first filter circuit provided on at least one of a part of said optical main path located between said second and third optical couplers, and said third optical side path, said filter circuit having a wavelength-dependent insertion loss.

2. An optical component according to claim 1, further comprising:
   a controller for controlling temperatures of said optical paths by use of said first and second temperature controllers on the basis of the insertion loss of said first filter circuit, in order to set a loss for light with a predetermined wavelength propagating between said light input end and said light output end, to a desired value.

3. An optical component according to claim 1, wherein said first filter circuit comprises:
   a fifth optical coupler, a sixth optical coupler, and a seventh optical coupler respectively provided on one of a part of said optical main path located between said second and third optical couplers, and said third optical side path;
   a fourth optical side path provided between said fifth and sixth optical couplers and adjacent to a part of one of said optical main path and said third optical side path, wherein a third Mach-Zehnder interferometer is comprised of said fourth optical side path and said fifth and sixth optical couplers; and
   a fifth optical side path provided between said sixth and seventh optical couplers and adjacent to a part of one of said optical main path and said third optical side path, wherein a fourth Mach-Zehnder interferometer is comprised of said fifth optical side path and said sixth and seventh optical couplers;
   wherein an optical path length of said fourth optical side path is different from an optical path length of a part of one of said optical main path and said third optical side path located between said fifth and sixth optical couplers, and
   wherein an optical path length of said fifth optical side path is different from an optical path length of one of said optical main path and said third optical side path located between said sixth and seventh optical couplers.

4. An optical component according to claim 1, wherein said first filter circuit comprises a grating formed in one of a part of said optical main path and said third optical side path located between said second and third optical couplers.

5. An optical component according to claim 1, further comprising:
   a second filter circuit, in addition to said first filter circuit provided on at least one of a part of said optical main path and said third optical side path located between said second and third optical couplers, wherein said second filter circuit is provided on the other of the part of said optical main path and said third optical side path located between said second and third optical couplers, wherein an insertion loss spectrum of said first filter circuit is different from that of said second filter circuit.

6. An optical component according to claim 5, wherein each of said first and second filter circuits includes a grating.

7. An optical amplification module including an optical component according to claim 1.

8. An optical amplification module according to claim 7, further comprising a variable loss slope compensator.

9. An optical transmission system including an optical component according to claim 1.

10. An optical transmission system according to claim 9, further comprising a variable loss slope compensator.

* * * * *